Aug. 25, 1936.  H. W. BOTTEN  2,052,211
GRAPPLE
Filed July 1, 1935  2 Sheets-Sheet 1
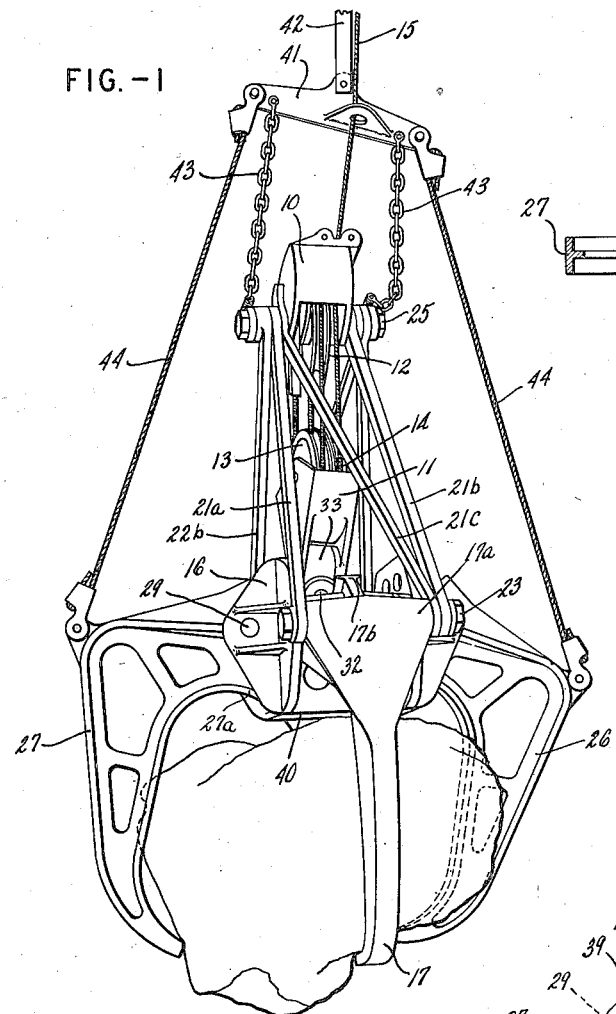
FIG.-1
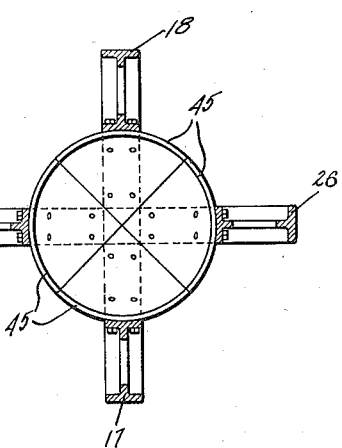
FIG.-6
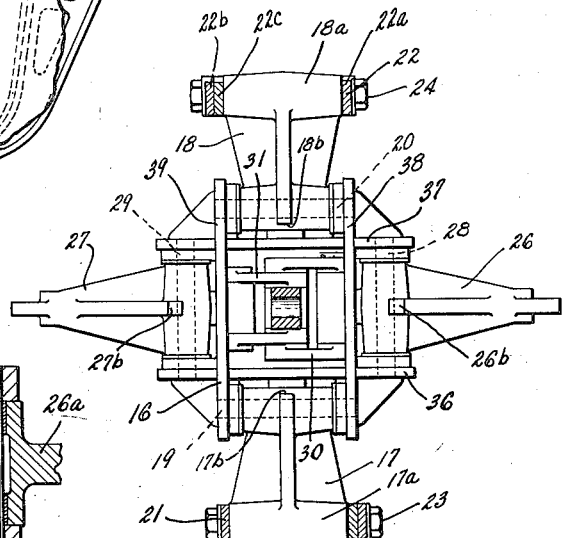
FIG.-2
FIG.-5
INVENTOR
HENRY W. BOTTEN
BY
*Burkett, Hyde, Higley + Meyer*
ATTORNEYS Aug. 25, 1936.  H. W. BOTTEN  2,052,211
GRAPPLE
Filed July 1, 1935  2 Sheets-Sheet 2
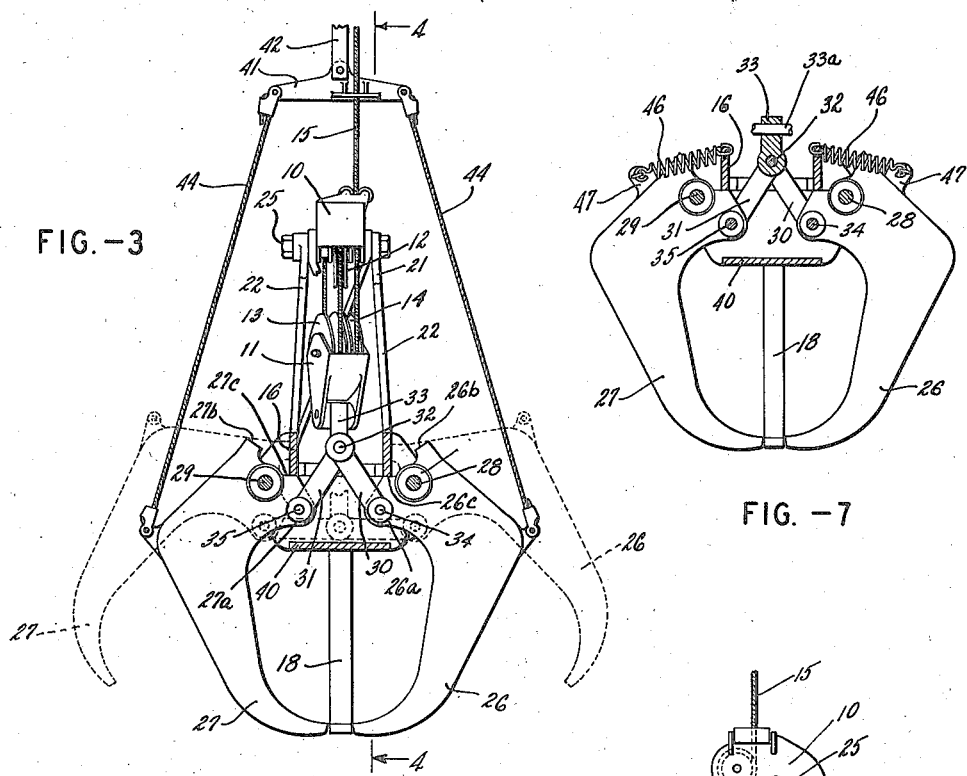
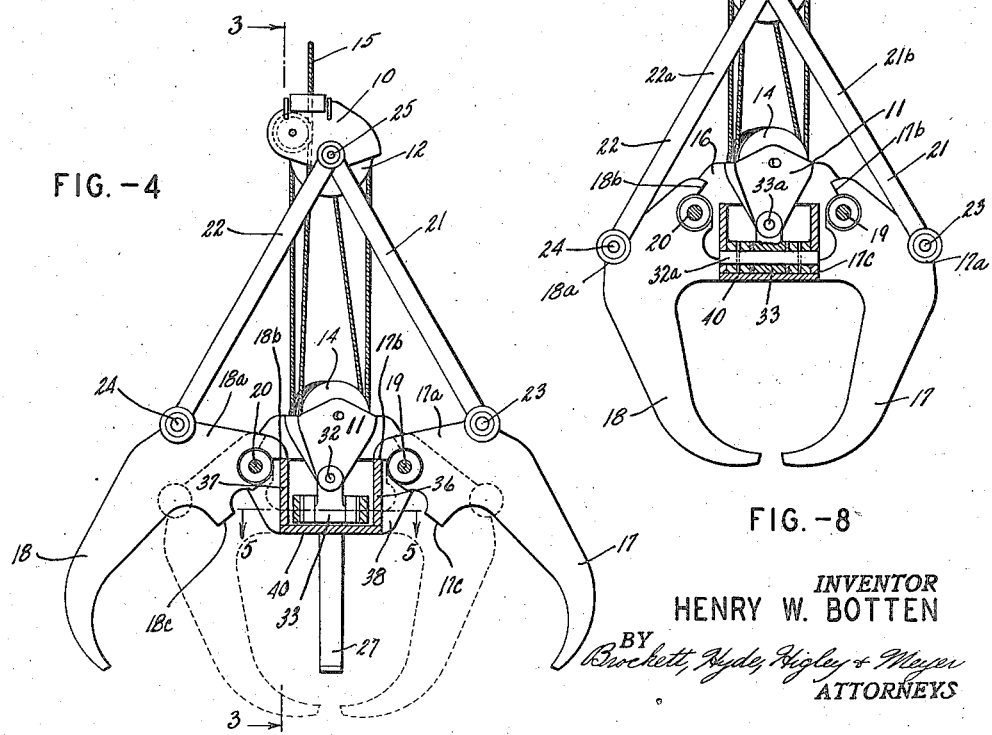
INVENTOR
HENRY W. BOTTEN
BY
Brockett, Hyde, Higley & Meyer
ATTORNEYS Patented Aug. 25, 1936

2,052,211

UNITED STATES PATENT OFFICE 2,052,211

GRAPPLE

Henry W. Botten, Shaker Heights, Ohio, assignor to The Owen Bucket Company, Cleveland, Ohio, a corporation of Ohio Application July 1, 1935, Serial No. 29,217

16 Claims. (Cl. 294—112)

This invention relates to a grappling device for handling earth, rocks and the like.

My invention provides a plurality of pairs of coacting jaw members with means for opening and closing the same, and the closing means being so constructed and arranged that the grabbing or holding effect between the pairs of jaws when closing upon a piece of work is equalized.

My invention provides a plurality of independently acting jaw members adapted to close upon irregular shapes, with the holding effect equalized among all the jaws. My grappling device provides a structure for carrying out the above described operations by very simple mechanism comprised of a few parts which may be built in a very rugged manner so that the apparatus does not easily get out of order.

My invention comprises other novel features which are set forth in the accompanying specification and illustrated in the drawings, and the essential features of which will be summarized in the claims.

In the drawings, Fig. 1 is a general perspective view of my device when closed upon an object of irregular shape; Fig. 2 is a top plan view of the lower portion of Fig. 1; Fig. 3 is a view partly in section and partly in elevation taken approximately through the center of the device shown in Fig. 1 to more clearly show the actuating mechanism for one pair of coacting jaws,— this view is along the line 3—3 of Fig. 4; Fig. 4 is a view similar to Fig. 3 of the device of Fig. 1 taken substantially at right angles to the view of Fig. 3 and along the line 4—4 thereof so as to show the operating mechanism for another pair of jaws; Fig. 5 is a detail sectional view along the line 5—5 of Fig. 4; Fig. 6 is a sectional view looking downward showing the lower part of a modified form of the device adapted to form an orange-peel bucket; Fig. 7 is a modification of the device of Figs. 1 to 5 showing another structure for opening one pair of jaw members; while Fig. 8 is a view similar to Fig. 4 showing a modification in which two jaw members only are used.

My improved grappling device is intended primarily for the handling of rocks and especially very large rocks, such as is necessary in the building of breakwaters, the clearing of harbor bottoms and similar locations, although it will be understood that my grappling device may be used in any place where grapples are normally necessary. It is a well known fact that when objects of irregular shape are grasped by the hooks or jaw members of a grapple device, those members which first engage the object receive substantially the entire strain with consequent unsatisfactory results. My improved device equalizes the load on all the jaw members and that without unnecessary complication of parts. My device is also adapted for digging earth or other material as will appear as the description proceeds.

Referring now particularly to Figs. 1, 3 and 4, my device includes an upper sheave block and head member 10 and a lower sheave block 11 in which are mounted sheaves 12, 13 and 14, it being understood that the arrangement of the sheaves may be in any suitable manner and is not a part of the present invention. As usual, a closing line 15 is reeved about the sheaves of the upper and lower sheave blocks and runs to suitable operating machinery. A lower head member 16 supports the jaw or grab members of which I show two coacting pairs positioned substantially at right angles to each other. Each of these jaw members is independently mounted by a suitable pivot or hinge pin on the lower head member 16. The pair of jaw members 17, 18 are pivotally mounted on the lower head member at 19 and 20 respectively. Each of these jaws has at its upper end an arm portion 17a and 18a at an outer portion of which are connected links 21 and 22 respectively. Link 21 is pivotally connected to jaw 17 at the point 23 and link 22 likewise connected to jaw 18 at the point 24. The link connections extend upwardly to the head block where they are suitably pivoted as upon the single pivot pin 25. As shown in the drawings, these link connections comprise side members 21a and 21b and a bracing member 21c. Each jaw member has suitable shoulder portions for stopping the movement of the jaw member at its full opened and full closed positions. These parts of jaw 17 are designated 17b and 17c and similar parts on jaw 18 are similarly designated. While the jaw members 17 and 18 are shown as substantially bellcrank or L-shape in form it will be understood that they need not be necessarily so constructed so long as there is a sufficient arm leverage between the points 23 and 19 on the one jaw and the points 24 and 20 on the other jaw. The operation of these two jaws just described and best seen in Fig. 4 will be readily recognized as similar to the action of the usual clamshell type.

The other pair of jaws 26 and 27 are pivotally mounted on the lower head member 16 at 28 and 29 respectively. These jaws are also provided with suitable stop portions 26b, 26c and similarly designated parts on jaw 27 for limiting their full open or full closed position. Crank arm portions are provided for oscillating these jaws about their pivots and in the present instance these crank arm portions are the parts 26a and 27a formed integral with the respective jaw portions. Between the lower sheave block 11 and these crank arm portions are suitable link connections for moving the jaws 26 and 27. In the form shown these links are a pair of toggle links 30 and 31 pivotally connected together at 32 and there connected by a link 33 with the sheave block 11. The other ends of the toggle links are pivotally connected at 34 and 35 with the crank arm portions 26a and 27a respectively.

The toggle link connections are more clearly shown in Fig. 5 where the link 30 is shown as having the two parts 30a, 30b and the link 31 has the two parts 31a and 31b. The pivot pin 32 is pinned to the links 30 and the links 31 and 33 oscillate freely thereon. Pin 34 is rigidly connected to links 30 and the crank arm portion 26 oscillates freely about this point. The pivot pin 35 is rigidly connected to links 31 and the crank arm portion 27a oscillates about this point. The pins are suitably provided with bushings as shown.

The link connection 33 provides a universal joint between the sheave block and the toggle links so that the sheave block 11 may take any of the angular positions in which it is placed in operation. To this end a pin 33a connecting link 33 and the sheave block 11 is placed at right angles to the pin 32.

The details of the lower head member 16 are best shown in Figs. 2, 3 and 4. Parallel portions 36 and 37 support the pins 28 and 29 and other parallel portions 38 and 39 support the pins 19 and 20. These intersecting parallel members form a central box-like portion having a bottom 40. The side portions 36 and 37 are partly cut away at the top as shown in Fig. 4 and provide stop members for the shoulders 17b and 18b. The members 38 and 39 are cut away at their lower portions to permit suitable movement of the toggle links 30 and 31. The lower head member 16 as shown is constructed of plate members welded together but it will be understood that the same may be fashioned by casting or otherwise, as desired.

It will be apparent from the description of the jaws 26 and 27 and a study of Fig. 3 that this pair of jaws is actuated upon relative movement between the lower sheave 11 and the lower head member 16 and this relative movement because of the links 30 and 31 will cause oscillation of jaws 26 and 27 about their pivots 28 and 29.

Above the head block is a holding member 41 to which a suitable holding line may be attached as at 42. The head block 10 is suitably suspended below the member 41 in a manner to permit relative movement between them. The connection shown comprises a pair of chains 43. Between the holding member 41 and the jaws 26 and 27 extend cables 44 which serve to move the connected jaws to open position upon suitable movement of the parts as will be next described.

In the operation of the device with all of the jaws in open position, both the holding line 42 and the closing line 15 are paid out until the grapple comes to rest over the object to be seized. A pull is then applied to the closing line which causes resultant relative approach between the sheave blocks 10 and 11. The first result of this motion is an upward pull on the link 33 and the toggle links 30 and 31 with resultant oscillation of jaws 26 and 27 from their wide open position shown in broken lines in Fig. 3 toward their closed position shown in full lines. This movement will cease when these two jaws have either closed upon an object or have come to the completely closed position shown in the drawings. If one of the jaws strikes a side of an object the other jaw is still free to move because of the arrangement of the links 30 and 31. When both of the jaws 26 and 27 have ceased to move, the further relative approach of sheave blocks 10 and 11 results in a direct pull of the upper sheave block toward the lower head member 16 which oscillates the jaw members 17 and 18 about their respective pivots until those jaws have engaged the object between them. These jaws are shown in their open position in Fig. 4 in full lines and in their closed position in broken lines. Since these jaws are independently connected to the upper and lower head members, if one of them engages an object the other is free to move until the object is clamped between them. When all four jaws have firmly engaged the object between them further relative movement between the blocks 10 and 11 ceases and the object may be raised and transported wherever desired. When the object is released the closing cable is paid out, the sheave blocks move down substantially as a unit until jaws 17 and 18 are released whereupon the sheave blocks commence to separate and the toggle links to straighten so as to open jaws 26 and 27 which occurs when that portion of the device from the head block down moves sufficiently away from the holding member 41 to create a tension in cables 44 which aids in the opening movement of the jaws 26 and 27.

Fig. 6 shows a manner in which the grappling device may be converted into an orange-peel bucket by attaching the digging members 45 to the lower portion of the jaw members. The view in Fig. 6 shows the bucket portion of the device in closed position.

Fig. 7 shows a modification which is similar in all respects to that form described in connection with Figs. 1 to 5 except that cables 44 are omitted and springs 46 are provided for aiding in the opening movement of jaws 26 and 27. These springs may be tension springs as shown, there being one or two springs for each of the jaw members 26 and 27 connected between the lower head member 16 and a suitable lug 47 on each of the jaws. In the closed position of the parts as shown in Fig. 7, these springs are stressed so that upon release of the tension in the closing line the springs will contract and open the jaws. My invention contemplates any other suitable arrangement of springs or counterweights for aiding in the opening of jaws 26 and 27.

Fig. 8 shows a manner in which my device may be modified when it is desired to use but two of the jaw members. In the form shown I have replaced the pin 32 of the form described in Figs. 1 to 5 by a pin 32a of sufficient length to pass through the toggle knuckle and the link 33 and to enter suitable openings in the lower head member 16 so as to secure the pin therein. This holds the lower sheave block 11 in fixed relation with the lower head member and the jaws 26 and 27 may then be disconnected from the device and the jaws 17 and 18 used alone. The opening and closing of these jaws 17 and 18 would then be accomplished by relative approach and separating movement of the sheave blocks 10 and 11 under the control of cable 15 in the usual manner.

The term "jaw member" or "grab member" as used throughout the specification and claims is intended to include not only hook members as shown in most of the views but digging members such as shown in Fig. 6, or other members of intermediate form where the same are actuated by the improved mechanism described which permits the independent gripping action of the members which engage the object.

I claim as my invention the use of a pair of toggle links pivotally connected together and there connected to the closing means, and each of the toggle links having an end connected to one of a pair of coacting jaw members, whether this toggle mechanism is utilized alone in a device having but one pair of coacting jaws or in a combined structure with another or other pairs of jaws. In other words, the toggle link connection between the lower sheave block 11 and the jaw members 26 and 27, as best seen in Figs. 3 and 7, I regard as a very valuable form of operative connection for a pair of jaw members, whether the same be hooks as shown or digging members of the clamshell type. It will be obvious from a study of the drawings that in the form shown in Figs. 3 and 7, the toggle links 30 and 31 will be more nearly their straightened position in the wide open position of the jaws. The purpose of this arrangement in this device is to apply the maximum gripping force on the largest size rock which the grapple may seize upon. It will be understood, however, that these toggle links may be differently placed depending upon the position of the jaws corresponding to the greatest gripping force desired to be exerted between them. For instance, if the jaws were clamshell members the greatest gripping or digging effect would be desirable as the jaws approached closed condition. In such a case I should cause the toggle links 30 and 31 to break downwardly instead of upwardly as shown. In such an arrangement the toggle links would approach straightened position as the jaws approached their closed position.

What I claim is:

1. In a grappling device, two pairs of coacting grab members, an upper head, two lower members, means connecting said lower members for relative movement toward and from each other, a closing line reeved between said upper head and one of said lower members for causing relative approach and separating movement between them, means actuated by relative movement between said lower members for operating one only of said pairs of grab members, and means actuated by relative movement between said upper head and its associated lower member for operating the other of said pairs of grab members.

2. In a grappling device, two pairs of coacting grab members, a pair of sheave blocks, a head member connected with one of said blocks for relative movement toward and away from it, means for causing relative approach and separating movement between said sheave blocks and for also causing relative movement between said head member and its associated block, means actuated by relative movement between said blocks for operating one pair only of said grab members, and means actuated by relative movement between said head member and its associated block for operating the other pair only of said grab members.

3. In a grappling device, two pairs of coacting grab members, an upper head including a sheave block, a lower head, a sheave block mounted on said lower head for vertical movement relative thereto, a closing line reeved about said upper and lower sheave blocks for causing relative approach and separating movement between them, means actuated by relative movement between said lower head and said lower sheave block for operating one pair only of said grab members, and means actuated by relative movement between said upper and lower heads for operating the other pair of grab members.

4. In a grappling device, an upper head including a sheave block, a lower head, a sheave block mounted on said lower head for movement relative thereto, a closing line reeved about said upper and lower sheave blocks for causing relative approach and separating movement between them, two pairs of coacting grab members, each member of each pair being pivotally supported on said lower head independently of the other members, means actuated by relative movement between said lower head and said lower sheave block for operating one pair only of said grab members, and means actuated by relative movement between said upper and lower heads for operating the other pair of grab members.

5. In a grappling device, an upper head, a sheave block carried thereby, a lower head, a lower sheave block, motion transmitting mechanism connecting said lower sheave block with said lower head, means for causing relative movement between said sheave blocks, two pairs of coacting grab members pivotally mounted on said lower head, means actuated by said motion transmitting mechanism for operating one pair only of said grab members, and means actuated by relative movement between said upper and lower heads for operating the other pair of grab members.

6. In a grappling device, an upper head, a sheave block carried thereby, a lower head, a lower sheave block above said lower head, a connection permitting relative movement between said lower head and lower sheave block, means for causing relative approach of said sheave blocks, two pairs of coacting grab members pivotally mounted on said lower head, means actuated by relative movement between said lower head and lower sheave block for operating one pair only of said grab members, and means actuated by relative approach between said upper and lower heads for operating the other pair of grab members.

7. In a grappling device, upper and lower sheave blocks, a closing line reeved about said blocks for causing relative approach and separating movement between them, a lower head member, two coacting pairs of jaw members, said pairs being positioned at right angles to each other, each jaw member of one only of said pairs having at its upper end an arm portion extending at an angle from the jaw portion inwardly to said lower head member and there pivotally connected, a link connecting an outer part of each arm portion with said upper sheave block, each jaw member of the second pair being pivotally mounted on said lower head member, and link connections between said lower sheave block and each of said jaw members of the second pair only for oscillating the latter about their pivots as the lower sheave block moves relative to said lower head member.

8. In a grappling device, upper and lower sheave blocks, a closing line reeved about said blocks for causing relative approach and separating movement between them, a lower head member, two coacting pairs of jaw members, said pairs being positioned at right angles to each other, each jaw member of one pair only being pivotally mounted on said lower head member and having a linkage connection with said upper sheave block arranged to close said one pair of jaw members by relative approach of said upper sheave block and said lower head member, each jaw member of the second pair being pivotally mounted on said lower head member, and link connections between said lower sheave block and each of said jaw members of the second pair only for oscillating the latter about their pivots as the lower sheave block moves relative to said lower head member.

9. In a grappling device, upper and lower sheave blocks, a closing line reeved about said blocks for causing relative approach and separating movement between them, a lower head member, two coacting pairs of jaw members, said pairs being positioned at right angles to each other, each jaw member of one pair being pivotally mounted on said lower head member and having a linkage connection with said upper sheave block arranged to close said one pair of jaw members by relative approach of said upper sheave block and said lower head member, each jaw member of the second pair being pivotally mounted on said lower head member, a crank arm portion for oscillating each jaw member of said second pair about its pivot, and a pair of toggle links pivotally connected to each other and there connected to said lower sheave block, the free end of each toggle link being connected to one of said crank arm portions.

10. A grappling device as in claim 9, and in which the connection between said toggle links and said lower sheave block is a universal joint.

11. A grappling device as in claim 8, including a holding member above said upper sheave block and to which a holding line may be attached, a connecting member between said holding member and sheave block, and other connecting members between said holding member and each jaw member of said second pair for opening the connected jaw members upon holding said holding member and paying out on said closing line.

12. A grappling device as in claim 8, including spring means operatively connected between said lower head member and each jaw member of said second pair for opening said jaws, and said spring means arranged for loading of the spring upon closing movement of the associated jaw member.

13. In a grappling device, an upper head, a lower frame, a pair of jaws pivotally mounted on said lower frame, linkage connecting said upper head with each jaw in a manner to close said jaws only by relative approach of said upper head and lower frame, a second pair of jaws, means for closing said second pair of jaws including motion transmitting mechanism having a part carried by said frame, means for causing relative approach between said upper head and a portion of said motion transmitting mechanism for closing said second pair of jaws, whereby said lower frame is moved when said part is held by said second pair of jaws meeting a resisting object.

14. In a grappling device, upper and lower sheave blocks, means for causing relative approach and separating movement between said sheave blocks, a lower head frame adapted to pivotally support two pairs of oppositely disposed jaw members, one pair of jaw members supported on said lower frame, linkage connecting said upper block and each jaw member in a manner to close said jaw members by relative approach of said upper block and lower frame, and a separable connection between said lower sheave block and said lower frame, whereby with said connection fastened a two-jaw device is provided, and by separating said connection and mounting an additional pair of jaws on said lower frame and inserting motion transmitting mechanism between said additional jaws and lower sheave block a four-jaw device is provided.

15. In a device of the class described, an upper sheave block, a jaw support, two pairs of coacting jaws pivotally mounted on said support, spacing means holding said upper sheave block and said jaw support in spaced relation, a pair of toggle links one for operating each jaw of one of said pairs of jaws, said toggle links being pivotally connected together and the other end of each toggle link being operatively connected with its respective jaw to oscillate the same about its pivot, lower sheave block means, said lower sheave block means being operatively connected with said toggle links where the latter are connected together, means for causing relative approach between said upper sheave block and said lower sheave block means to actuate said one pair of jaws to grip material between them, and said last named means and said spacing means having operative connections with said other pair of coacting jaws arranged in a manner to cause closing movement of said other pair of jaws by further relative approach of said upper sheave block and said lower sheave block means after said one pair of jaws has closed.

16. In a grappling device, an upper head, a lower head, two pairs of independently operable coacting jaw members, at least one pair of said jaw members being mounted on said lower head, means for closing said one pair of jaw members by relative approach movement between said heads, operating mechanism for said other pair of jaw members operable in jaw closing direction by relative approach between said upper head and said mechanism, said operating mechanism including a part carried by said lower head, and means for causing relative approach between said upper head and said operating mechanism.

HENRY W. BOTTEN.